(No Model.)
J. P. BATCHELOR.
SAW MILL DOG.
No. 425,158. Patented Apr. 8, 1890.
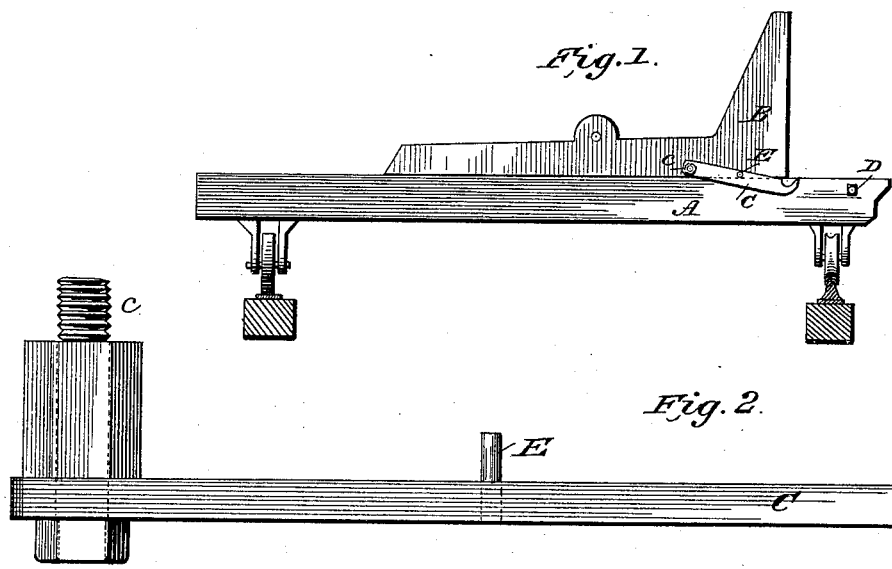
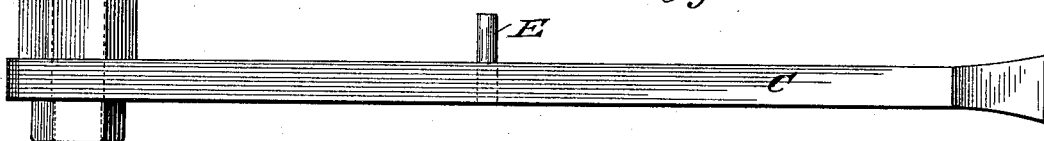
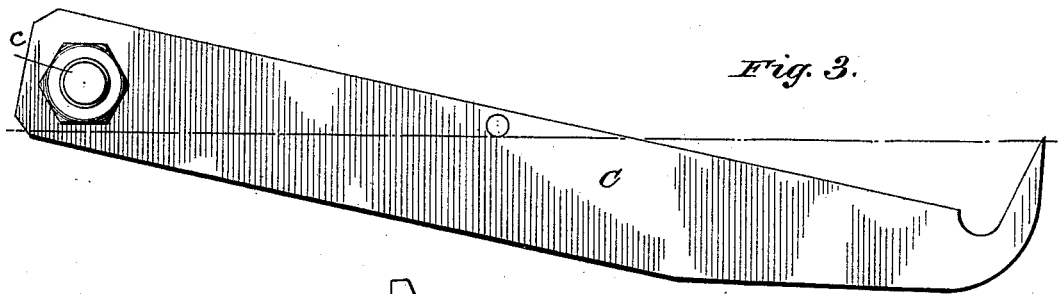
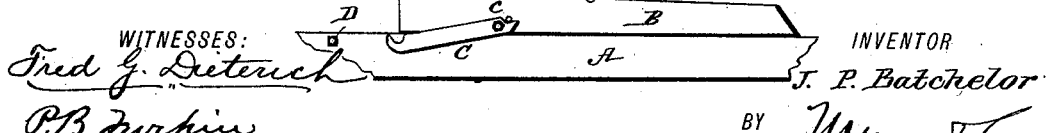
WITNESSES:
Fred G. Dieterich
P. B. Turpin
INVENTOR
J. P. Batchelor
BY
ATTORNEY

UNITED STATES PATENT OFFICE.

JAMES P. BATCHELOR, OF BEARDEN, ARKANSAS.

SAW-MILL DOG.

SPECIFICATION forming part of Letters Patent No. 425,158, dated April 8, 1890.

Application filed June 17, 1889. Serial No. 314,659. (No model.)

*To all whom it may concern:*

Be it known that I, JAMES P. BATCHELOR, a citizen of the United States, residing at Bearden, in the county of Ouachita and State of Arkansas, have invented a new and useful Improvement in Saw-Mill Dogs, of which the following is a specification.

My invention is an improvement in saw-mill dogs; and it consists in the novel constructions and combinations of parts hereinafter described, and pointed out in the claims.

In the drawings, Figure 1 is a side view of my invention as in use. Figs. 2 and 3 are detail enlarged views, and Fig. 4 shows a different construction of stop device.

The head-block A and knee B may in general respects be of ordinary construction, the knee B being supported on the head-block so that it may be moved forward and back, as may be desired.

The dog C is pivoted at its rear end at $c$ to the knee B at one side of the latter, and is arranged at its forward end to lap down alongside the head-block A, which latter has near its forward edge a lateral projection or bearing D, arranged to be engaged by the forward end of the dog C as the latter is moved forward in such manner that as the knee and with it the dog are moved forward the under side of the forward end of the dog will engage on the bearing or projection D and be forced upward, so that the bit or prong at the forward end of the dog will be forced upward and enter the log and hold the same tightly to the knee. It will be noticed that the dog is pivoted at its rear end to the knee at one side of the same and is arranged to lap down alongside the head-block with its forward end arranged and adapted to engage the projection D, which may preferably be a bolt, as shown.

Now, to hold the dog from falling too low when it is clear of the bearing D, I provide it between its ends with a pin or stud E, which extends laterally and is arranged to engage the upper surface of the head-block, so that the dog, when the knee is moved back, is held in proper position to engage the bearing D when the knee is moved forward.

It will be understood that the described construction is intended for use as an auxiliary to a top dog, which latter may be of any desired construction.

In operation as the knee is moved forward the dog is forced up into the edge of the log or timber, and when the knee is moved back to bring the forward end of the dog in rear of the projection D the dog will drop down. The purpose of this auxiliary dog is to hold the bottom of the board from slipping off the block when near the end.

In the construction of some knees they are made to cover the entire upper surface of the block, in which case the use of the pin-stop E would of course not be practicable. In such case the dog C may be extended slightly in rear of its pivot, and such extension be arranged to engage under a lateral pin or projection on the knee and so limit the downward movement of the forward end of the dog.

Having thus fully described my invention, what I claim as new, and desire to secure by Letters Patent, is—

1. The combination, with the head-block and the knee movable thereon, of the dog pivoted at its rear end to the knee and arranged to lap down alongside the head-block, and a lateral projection provided on the head-block in position for engagement by the forward end of the dog as the knee is moved forward, substantially as set forth.

2. The combination of the head-block having a projection or bearing, the knee movably supported on said head-block, and the dog pivoted at its rear end to the knee adapted at its forward end for engagement with the projection or bearing of the head-block, and provided between its ends with a stud or projection arranged to engage the head-block and limit the downward movement of the forward end of the dog, substantially as set forth.

3. The combination, substantially as described, of the head-block having a lateral projection or bearing D, the knee supported and movable on said head-block, and the dog pivoted at its rear end to the knee at one side of the latter, having its opposite or rear end arranged to engage upon the lateral projection or bearing of the head-block and provided between its ends with a lateral projection arranged to engage the upper surface of the head-block, all substantially as and for the purposes specified.

4. The improvement in saw-mills, substantially as herein described, comprising the head-block provided with the projection or bearing D, projected laterally from its side, the knee supported and movable on said head-block, the dog arranged at the side of the knee and in a plane to one side of the head-block, whereby the dog may move down along the outside of such block, the said dog being pivoted at its rear end to the knee and arranged at its forward end to engage the projection D, and the projection E, extended laterally in from the dog toward the knee and arranged to engage on the top surface of the head-block, said projection E being arranged between the ends of the dog, and all being constructed and arranged substantially as and for the purposes set forth.

JAMES P. BATCHELOR.

Witnesses:
   JOHN BELAND,
   ALBERT BELAN.